United States Patent

[11] 3,545,366

| [72] | Inventor | Hans Bruhin |
| | | Siebnen, Switzerland |
| [21] | Appl. No. | 666,675 |
| [22] | Filed | Sept. 11, 1967 |
| [45] | Patented | Dec. 8, 1970 |

[54] APPARATUS FOR STORING WHEELS OF CHEESES
4 Claims, 3 Drawing Figs.

[52] U.S. Cl. .................................................. 99/243, 308/5
[51] Int. Cl. .................................................. A23c 19/00
[50] Field of Search ....................................... 99/243, 115, 116, 162, 269, 271; 31/49; 25/153; 308/5, (A); 180/125; 214/1(AB); 34/(Inquired)

[56] References Cited
UNITED STATES PATENTS

| 2,938,590 | 5/1960 | Barnett | 180/125 |
| 2,942,385 | 6/1960 | Pal | 308/(A)UX |
| 3,081,886 | 3/1963 | Flexman et al. | 180/125X |
| 3,106,431 | 10/1963 | Hartley | 308/5 |
| 3,437,469 | 4/1969 | Peyches | 214/1(AB)UX |

*Primary Examiner*—Walter A. Scheel
*Assistant Examiner*—Arthur O. Henderson
*Attorney*—Werner W. Kleeman ABSTRACT: A method of and apparatus for storing wheels of cheeses. The method contemplates the steps of placing a wheel of cheese upon a support, and forming by means of a pressurized fluid medium at the underside of the wheel of cheese a fluid circulation or a fluid cushion. The apparatus for carrying out the method of storing wheels of cheeses comprises at least one support member for a wheel of cheese, such support member having an upper surface provided with at least one groove means for distributing the pressurized fluid medium. Further, a pressurized fluid medium-conduit means emerges from beneath the surface of the support member, and said pressurized fluid medium-conduit means is adapted to be connected to a source of pressurized fluid medium for delivering the latter to the aforesaid support member.

PATENTED DEC 8 1970

3,545,366

INVENTOR
HANS BRUHIN

BY Jacobi & Davidson

ATTORNEY

3,545,366

APPARATUS FOR STORING WHEELS OF CHEESES

BACKGROUND OF THE INVENTION

The present invention relates to an improved apparatus for storing wheels of cheeses.

The wheels of cheeses are stored upon wooden boards during their ripening process in ripening chambers such as heating and storage cellars. The wheel of cheese tends to soil very quickly and intensively upon the support surface, whereas the free upper surface remains clean. The wheel of cheese must be turned and washed at short time intervals particularly in the heating cellars employing the known storage techniques. However, the storage boards are also strongly soiled during the ripening process, and therefore, after each washing of a wheel of cheese such storage boards must be exchanged for a different dry board. The soiled storage boards must be washed and dried. Such washing and drying of the boards as well as the washing of the relatively heavy wheels of cheeses is difficult, Time-consuming and cumbersome, and furthermore, owing to the repeated washing away of the relatively thick soiled layer the cheese loses a certain amount of its original weight.

SUMMARY OF THE INVENTION

Accordingly, it is a primary object of the present invention to provide an improved apparatus for storing wheels of cheeses which effectively overcomes the aforementioned drawbacks.

Another, more specific object of the present invention is directed to an improved apparatus for the effective storing of wheels of cheeses in such a manner that the ripening process of the cheese can proceed with a minimum of attention to the cheeses as well as the processing apparatus itself, thereby providing for a more economical and efficient cheese ripening procedure.

Still a further significant object of the present invention pertains to an improved apparatus for storing wheels of cheeses wherein processing of the cheese can be carried out extremely efficiently, with a minimum of attention to the installation, without undue loss of the original mass of the cheese, and in an extremely simple and efficient manner.

Yet a further significant object of this invention pertains to improved apparatus for storing wheels of cheeses for perfecting ripening thereof in an extremely rapid, efficient and economical manner.

Now, in order to achieve these and still further objects of the invention which will become more readily apparent as the description proceeds, the inventive apparatus is generally characterized by the features that beneath the wheel of cheese there is formed a fluid cushion by means of a pressurized fluid medium or gas, for instance pressurized air.

The inventive apparatus is generally manifested by the features that there is provided a plate member having a raised edge, and that within the surface of the plate member surrounded by the edge there emerges a conduit for a pressurized fluid medium. This conduit is capable of being connected to a source of pressurized fluid medium for delivering the latter to the plate member.

Owing to the inventive apparatus it is possible to considerably overcome the cumbersome manual operations which were previously required with prior art cheese processing techniques and also to reduce the loss in weight of the wheels of cheeses which were experienced for the reasons previously explained.

BRIEF DESCRIPTION OF THE DRAWING

The invention will be better understood, and objects other than those set forth above, will become apparent, when consideration is given to the following detailed description thereof. Such description makes reference to the annexed drawing wherein.

DESCRIPTION OF THE PREFERRED EMBODIMENT

Figure 1:
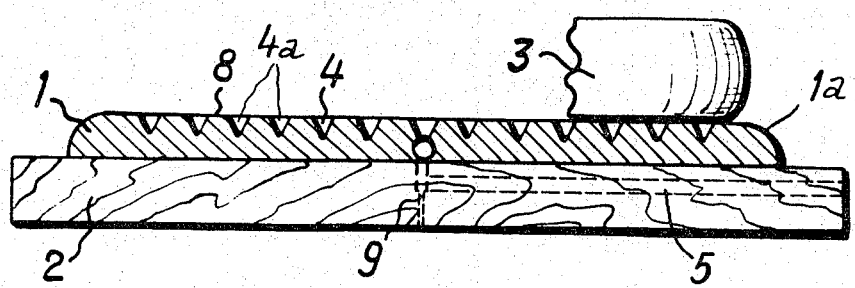
FIG. 1 schematically illustrates a sectional view through a plate member for storing a wheel of cheese.
Figure 3:
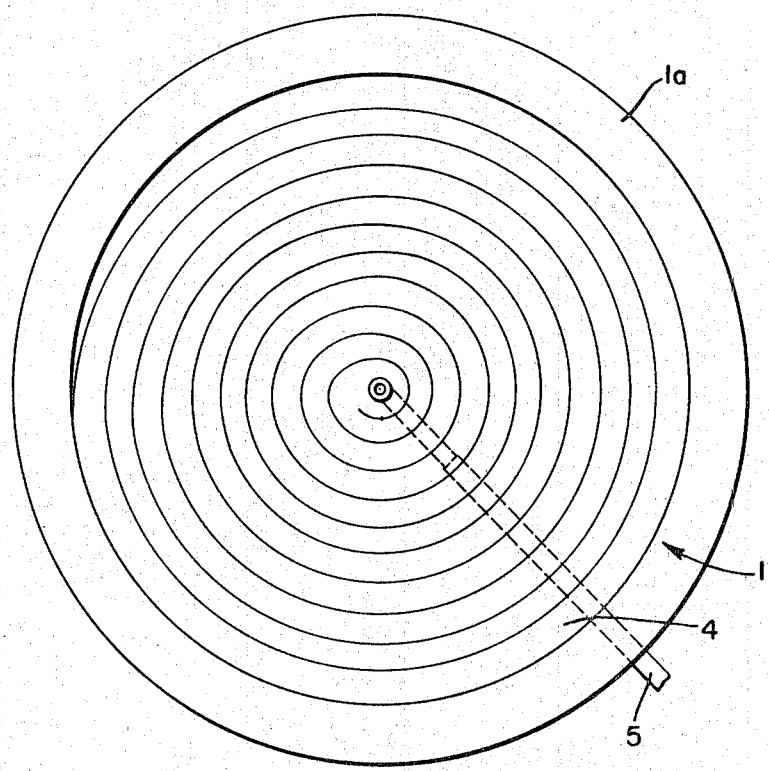
FIG. 3 is a plan view of the plate member of FIG. 1.

Turning attention now to the drawings and, more particularly referring now to FIG. 1 it will be seen that the inventive apparatus incorporates a substantially circular-shaped support member in the form or a plate member 1 having an edge 1a. The surface of the plate member 1 which is disposed within the edge 1a possesses a substantially spiral-shaped groove 4 which extends up to the center of the plate member 1 as best seen in FIG. 3. Furthermore, it will be recognized that a conduit 5 for a pressurized fluid medium, such as air, merges with the central region of the plate member 1. This air conduit 5 is directed towards the outside and can be connected to a suitable nonillustrated source of compressed or pressurized air for delivering such compressed air to the interior of the plate member 1. Additionally, it will be seen that this plate member 1 is supported at its undersurface upon a suitable carrier or support member 2. This carrier or support member 2 is preferably a wooden board or equivalent structure.

Now, in order to store and ripen a wheel of cheese 3 the latter is placed upon the plate member 1, so that this wheel of cheese 3 comes to bear upon the webs 8 which are located between the spiral groove means 4. Air or a different gas, for instance delivered by a compressor, is introduced through the conduit means 5. This compressed air acts uniformly at all of the hollow compartments 4a disposed between the webs 8 and forms an air cushion beneath the wheel of cheese 3. The pressure can be calculated such that the wheel of cheese 3 bears in sealing fashion at the outside or external region against the plate member 1, so that a pressure prevailing at the central region can be essentially maintained without any or only with a small further introduction of pressurized air or the like.

However, it is to be distinctly understood that it is also possible to build up a greater pressure beneath the wheel of cheese 3, so that the latter will be raised by the thus formed air cushion of the like and the pressurized air beneath the wheel of cheese 3 can flow away towards the outside. In this instance, there occurs a continuous introduction of compressed air through the conduit means 5 to the plate member 1, whereas in the previously considered situation the air introduction can take place intermittently for instance. In so doing, the wheel of cheese 3 is mounted in floating fashion upon the formed air cushion. An advantageous air circulation can be obtained in the storage cellar owing to the air which is streaming out between the wheel of cheese 3 and the plate member 1.

Figure 2:
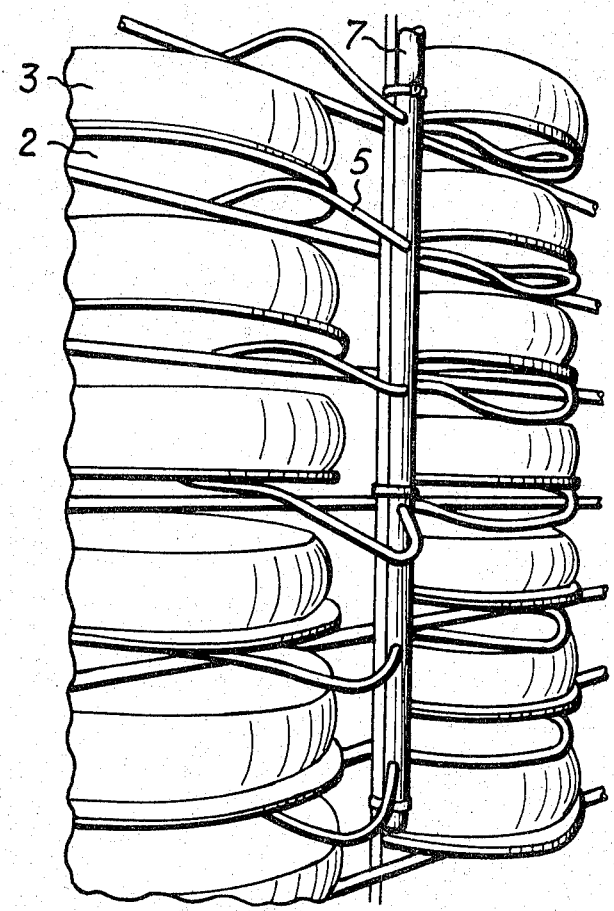
FIG. 2 is a perspective view of a cheese storage arrangement equipped with the inventive apparatus.

Furthermore, as will be recognized by inspecting FIG. 2, it is possible during the storage of a number of wheels of cheeses in a storage cellar to operatively connect a number of superimposed or adjacently arranged plate members 1 by means of a conduit 5 to a common compressed air channel 7. The plate member 1 can be formed by plastic, metal, wood or any other suitable material.

It has been found in practice that for the purpose of the present invention an excess air pressure of about 0.04 atmospheres absolute pressure is sufficient. The excess air pressure is maintained beneath 0.1 atmospheres absolute pressure.

It is also possible to provide the air conduit 5 with at least one downwardly opened aperture or small hole 9, in order to generate an air circulation at the upper surface of the next lower wheel of cheese where the plate members are stacked above one another.

Furthermore, in view of the fact that the spiral groove 4 is open at its top, allowing the air therein to directly contact the cheese, it is possible to undertake an air flushing at the support side of the cheese, in other words at the underside thereof. The inventive apparatus is especially suitable for the processing of various types of hard cheeses, such as Emmentaler or Gruyere.

Thus, while there is shown and described a present preferred embodiment of the invention, it is to be distinctly understood that the invention is not limited thereto, but may be otherwise variously embodied and practiced within the scope of the following claims.

I claim:

1. An apparatus for storing wheels of cheese, said apparatus comprising a plurality of stacked adjacently arranged support members for wheels of cheese, each support member having an upper supporting surface provided with at least one substantially spiral-shaped groove means for distributing a pressurized fluid medium and providing a fluid cushion beneath an associated cheese wheel during storage and ripening thereof, a pressurized fluid medium conduit means emerging from beneath the surface of each said support member, each said conduit means being adapted to be connected to a source of pressurized fluid medium for delivering said pressurized fluid medium to a respective support member and means provided for said conduit means defining at least one downwardly directed opening for generating a fluid circulation over the upper surface of the associated cheese wheel of the next lower support member.

2. An apparatus for storing wheels of cheeses as defined in claim 1, wherein said support member is substantially plate-shaped.

3. An apparatus for storing wheels of cheeses as defined in claim 2, wherein said conduit means opens into said substantially spiral-shaped groove.

4. An apparatus for storing wheels of cheeses defined in claim 3, wherein said substantially spiral-shaped groove is closed at the outside.